(12) United States Patent
Jang et al.

(10) Patent No.: US 6,473,263 B2
(45) Date of Patent: *Oct. 29, 2002

(54) COVER STRUCTURE OF HARD DISK DRIVE WITH AIR DAMPING LAYER

(75) Inventors: Jae-Seung Jang, Suwon-shi (KR); Byung-Gyou Choi, Kumi-shi (KR)

(73) Assignee: Samsung Electronics Co., Ltd., Suwon (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/441,518

(22) Filed: Nov. 17, 1999

(65) Prior Publication Data

US 2002/0071201 A1 Jun. 13, 2002

(30) Foreign Application Priority Data

Nov. 17, 1998 (KR) .............................. 98/49257

(51) Int. Cl.[7] .............................................. G11B 33/08
(52) U.S. Cl. ................................................... 360/97.01
(58) Field of Search .......................... 360/97.01, 97.02, 360/244.2, 97.03, 97.04; 369/263

(56) References Cited

U.S. PATENT DOCUMENTS

| | | | |
|---|---|---|---|
| 4,908,737 A | * 3/1990 | Murakami et al. | 361/419 |
| 5,021,905 A | 6/1991 | Sleger | 360/97.02 |
| 5,282,100 A | * 1/1994 | Tacklind et al. | 360/97.02 |
| 5,510,954 A | 4/1996 | Wyler | 361/685 |
| 5,538,774 A | 7/1996 | Landin et al. | 428/64.1 |
| 5,587,855 A | 12/1996 | Kim | 360/97.02 |
| 5,596,483 A | 1/1997 | Wyler | 361/685 |
| 5,760,998 A | * 6/1998 | Berberich et al. | 360/97.02 |
| 5,781,373 A | * 7/1998 | Larson et al. | 360/97.02 |
| 5,825,585 A | 10/1998 | Hatam-Tabrizi | 360/97.02 |
| 5,875,067 A | * 2/1999 | Morris et al. | 360/97.01 |
| 5,965,249 A | 10/1999 | Sutton et al. | 428/304.4 |
| 5,982,580 A | * 11/1999 | Woldemar et al. | 360/97.02 |
| 6,023,392 A | * 2/2000 | Kim | 360/97.01 |
| 6,088,190 A | * 11/2000 | Anderson | 360/97.02 |
| 6,144,522 A | * 11/2000 | Myokan et al. | 360/97.02 |
| 6,172,842 B1 | * 1/2001 | Satoh et al. | 360/97.01 |
| 6,229,668 B1 | * 5/2001 | Huynh et al. | 360/97.01 |

FOREIGN PATENT DOCUMENTS

| | | | |
|---|---|---|---|
| JP | 10255453 A | * | 9/1998 |
| JP | 10-139762 | * | 11/1999 |

* cited by examiner

*Primary Examiner*—Hoa T. Nguyen
(74) *Attorney, Agent, or Firm*—Robert E. Bushnell, Esq.

(57) ABSTRACT

A cover structure of a hard disk drive (HDD) can optimally suppress noises and vibrations generated in the HDD. The hard disk drive includes a cover, a cover damper mounted on the cover, and an air layer provided between the cover and the cover damper.

36 Claims, 12 Drawing Sheets

MODEL A

MODEL B

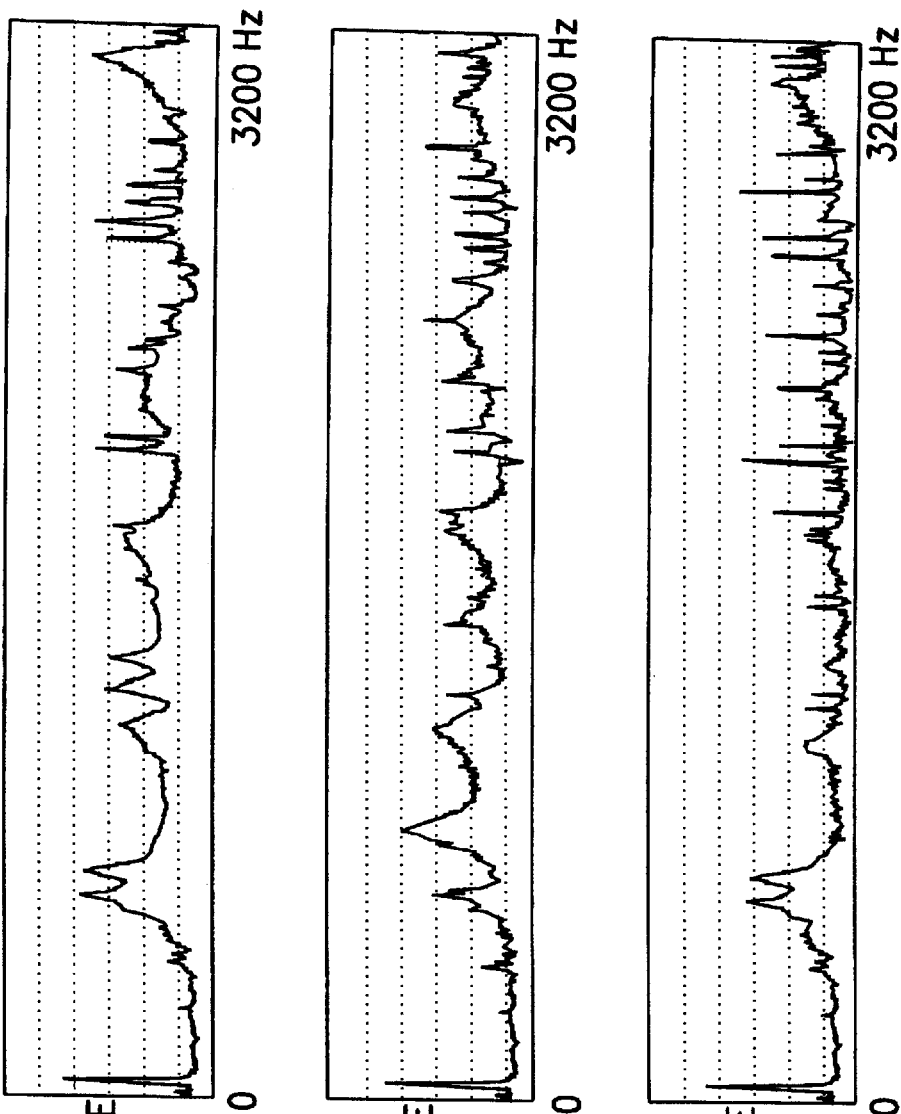

COVER STRUCTURE OF HARD DISK DRIVE WITH AIR DAMPING LAYER

CLAIM OF PRIORITY

This application makes reference to, incorporates the same herein, and claims all benefits accruing under 35 U.S.C. §119 from an application entitled *COVER STRUCTURE OF HARD DISK DRIVE* earlier filed in the Korean Industrial Property Office on Nov. 17, 1998 and there duly assigned Ser. No. 98-49257.

BACKGROUND OF THE INVENTION

1. Field of the Invention

The present invention relates generally to a storage device, and in particular, to a cover structure of a hard disk drive (HDD), which can minimize internal noises and vibrations.

2. Description of the Related Art

A hard disk drive, which is widely used for an auxiliary storage of a computer, is divided into a printed circuit board assembly (PCBA) and a head disk assembly (HDA). The PCBA includes a PCB on which various electric and electronic devices are mounted. The HDA includes major mechanical devices such as head, disk, voice coil motor (VCM), actuator, etc., and minor circuit devices.

In such a hard disk drive, internal noises are generated from the mechanical devices such as the spindle motor, disk, head, VCM, arm, etc. Such noise sources are surrounded by a cover and a base, so that the cover and base should be designed in full consideration of the noises and vibrations. Particularly, in most cases, the cover is thinner than the base, so that the noises may be transmitted (or permeate) through the cover. Further, vibrations originating from the base may be transferred to the cover, causing a new noise source.

Examples of the contemporary art of devices to dampen noise from hard disk drives are seen in the following U.S. patents. U.S. Pat. No. 5,825,585, to Hatam-Tabrizi, entitled *Laterally Constrained And Damped Mount For A Hard Disk Drive,* describes an assembly that couples a spindle shaft to the cover of a hard disk drive, for dampening vibration loads and for reducing the acoustic noise from the drive to the enclosure.

U.S. Pat. No. 5,587,855, to Kim, entitled *Supporting Device For Minimizing Vibration, Noise And External Impact Of A Hard Disk Drive,* describes a supporting device having a plate fixed to the shaft of a spindle motor and a damper made of a soft elastomer on the upper portion of the plate, for damping vibration energy.

U.S. Pat. Nos. 5,510,954 and 5,596,483, to Wyler, entitled *Silent Disk Drive Assembly* and *Silent Air Cooled Computer Having A Hard Disk Drive With An Acoustic Shield And A Heat Sink Arranged Exterior To The Drive,* respectively, describe an acoustically shielded hard disk drive having a sound absorption layer surrounding the disk drive assembly. An embodiment in which the disk drive is enveloped in sound proofing material and housed in an airtight one-eighth inch acrylic housing is described. In addition, a fluid containing pouch and a metal bracket surround the hard disk drive inside the sound proofing material. This is an elaborate and expensive arrangement for providing soundproofing.

U.S. Pat. No. 5,021,905, to Sleger, entitled *Disk Drive Enclosure For Minimizing Stresses And A Vibration Damping Seal Therefor,* describes a disk drive in which the base and cover are connected with a peripheral gap which is sealed by means of a viscoelastic tape. The tape seal provides resonant damping in the drive structure. The ability of this arrangement to block sound passing through the cover is probably limited, however.

U.S. Pat. No. 5,538,774, to Landin et al., entitled *Internally Damped Rotatable Storage Article,* provides a method for dampening vibration of a rotatable storage article such as a hard disk by introducing a viscoelastic material as an inner layer of the article.

U.S. Pat. No. 5,965,249, to Sutton et al., entitled *Vibration Damping Composite Material,* describes a material which incorporates mechanically unstable materials within porous constructs. The patent illustrates a hard disk drive having the material for vibration damping of noise from the drive. As illustrated, a layer of the damping material is adhered to the cover of the disk drive and a constraining layer using an adhesive on each side. Also, a layer of the material may be applied to the top of the voice coil motor plates to dampen noise from the voice coil motor.

To solve the noise problems, one improved cover has a cover damper mounted thereon to reduce the internal noises and vibrations. For the cover damper, stainless steel is typically used, the rigidity of which is higher by about 10 times that of aluminum used for the cover.

Recently, to reduce the manufacturing cost and to simplify the manufacturing process, internal devices such as spindle motor and VCM have been modified. In particular, a process for manufacturing the cover has also been modified. Although modification of the spindle motor and VCM may contribute to reduction in noises and vibrations, thereby increasing performance of the hard disk drive, modification of the cover manufacturing process to thin-plate molding will reduce the thickness of the cover, causing an increase in noises and vibrations. Accordingly, there is a demand for a thin hard disk drive cover having an increased sound shielding capability in terms of noises and vibrations.

SUMMARY OF THE INVENTION

It is therefore an object of the present invention to provide an improved hard disk drive.

It is also an object of the invention to provide an improved structure of the cover of a hard disk drive.

It is a further object of the present invention to provide a cover of a hard disk drive which suppresses noise and vibration in the hard disk drive.

It is a yet further object of the invention to provide a cover of a hard disk drive which is thin.

To achieve the above objects, a hard disk drive according to an embodiment of the present invention includes a cover, a cover damper mounted on the cover, and an air layer provided between the cover and the cover damper.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 14A to 14C are diagrams comparatively illustrating vibration displacements in an idling state with respect to a non-modified cover model, a modified cover model (i.e., Model F) and a Model G which is the modified cover model mounted with the cover damper, respectively;

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1:
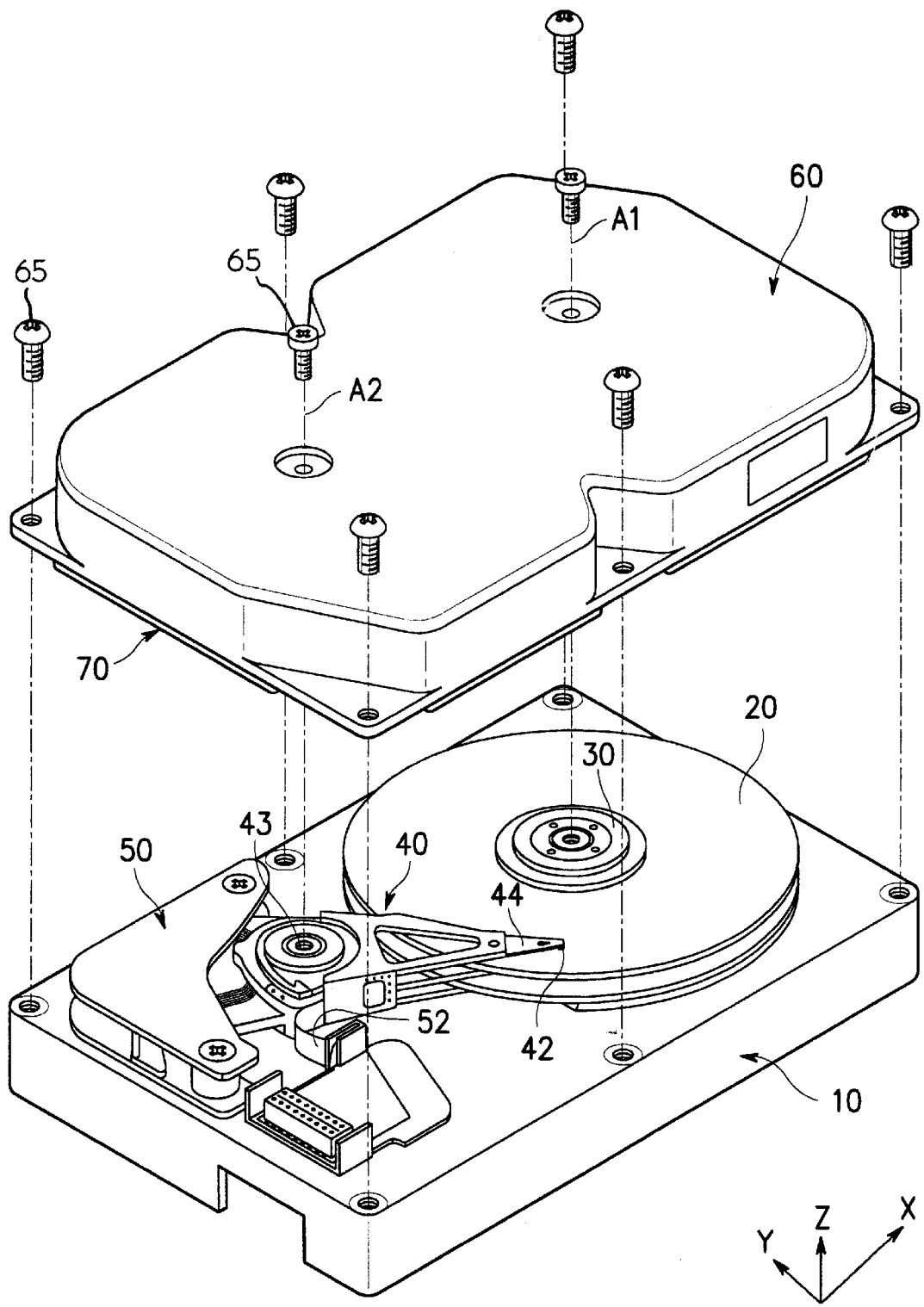
FIG. 1 is a perspective view illustrating a general hard disk drive.

Referring to FIG. 1, an HDD includes a base 10, a cover 60 mounted on the base 10, and a gasket 70 disposed between the cover 60 and the base 10, the gasket having a sealing function. Further, the HDD includes disks 20 rotating at high speed by a spindle motor 30 mounted on the base 10, and an actuator 40 having a magnetic head 42 for reading and writing data from and onto tracks on the disks 20. The actuator 40 is rotatably mounted around a pivot shaft 43. A bobbin mounted on an end of the actuator 40 moves left and right by operation of a voice coil motor (VCM) 50, so that the magnetic head 42 mounted on the other end of the actuator 40 radially moves over the disks 20 to read and write data from and onto a specific track on the disks 20. At this point, as the disks 20 rotates at high speed, the magnetic head 42 mounted on a leading end of a head gimbals 44 extended from an actuator arm, is raised up by an air current on the disk surface and thus, flies over the disk surface maintaining a fine gap with the disk surface. To provide an operating current and a control signal to a VCM coil disposed at a rear end of the actuator 40 and the magnetic head 42, the HDD includes a flexible printed circuit (FPC) 52 which is connected to a printed circuit board (PCB) on which various electronic circuits are disposed for controlling the HDD.

FIG. 1 shows a case where the hard disk drive cover 60 is fixed to the base 10 by eight screws 65, by way of example. Two of the eight screws are fixed to a shaft of the spindle motor 30 and the pivot shaft 43 of the actuator 40, respectively. In FIG. 1, the rotation axis of the spindle motor 30 is represented by A1 and the rotation axis of the actuator 40 is represented by A2, for convenience of explanation.

In the present invention, noise and vibration characteristics of the hard disk drive are predicted by way of computer simulation and analysis, so as to design a hard disk drive cover structure having the noises and vibrations reduced down to a reference level. The hard disk drive cover structure according to an embodiment of the present invention has a hollow plate structure.

For theoretical analysis of the noise and vibration characteristics of the hard disk drive, a sound shielding loss of a panel structure will be first analyzed. Finite element analysis and boundary element analysis are typically used in estimating noises and vibrations of the hard disk drive, which has the internal noise source surrounded by the cover and other elements. However, since the finite element analysis requires long analyzing time and many resources according to the object and range of the analysis, it is not appropriate for application to an initial developing step. In the embodiment, to reduce the analysis time, fundamental estimation is performed by an analytic technique and then more accurate results are calculated by finite element analysis.

Since the hard disk drive has a thin panel structure, the noises generated in the hard disk drive can transmit through the thin panel. Therefore, it is necessary to theoretically analyze the panel structure with respect to the noises.

To this end, a reference will be made to (1) sound shielding analysis for a thin plate, (2) sound shielding analysis for a multi-layered plate, (3) sound shielding analysis for a hollow plate, and (4) a coincidence phenomenon of a panel and a mass law.

(1) Sound Shielding Analysis for Thin Plate

In general, to calculate a sound shielding loss of a panel in the case where sounds transmit through a thin plate, consideration should be given to a boundary condition or shape of the panel. However, since it is very difficult to give full consideration to them, analysis is made on the assumption that the panel is an infinite plate, for convenience of the analysis, when there is a concern in a higher frequency. This is because the sound shielding loss of the panel depends on the thickness or property of the panel at the higher frequency, although it depends on the boundary condition or shape of the panel at the lower frequency.

Figure 2:
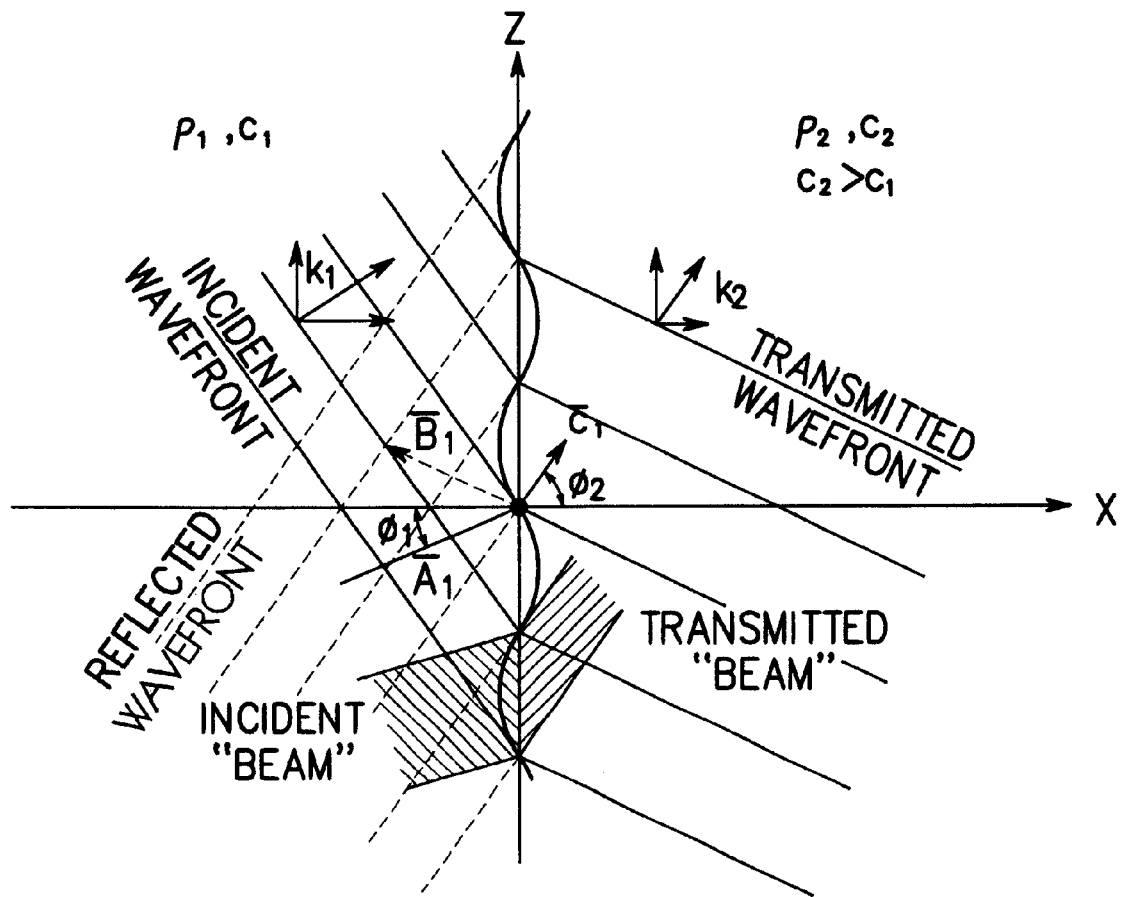
FIG. 2 is a diagram illustrating transmission characteristics for the case where sounds transmit through a thin plate.

FIG. 2 shows transmission characteristics for the case where sounds transmit through a thin plate. In this case, a transmission loss $R(\phi)$ of sound is represented by $$R(\varphi) = 20\log_{10}\left(\frac{\omega m \cos\varphi}{2\rho_0 c}\right) \text{ [dB]} \tag{1}$$

where

ω: the internal vibration number of the material (i.e., angular velocity)

m: surface density of the panel

φ: incident angle of the sound $\rho_0$: density of air c: transmission velocity of sound in the air Equation (1) represents a transmission loss of sounds with respect to a specific incident angle. Although incident of the sounds occurs at all angles, an actually transmittable incident angle is 0–70°. From experiments, a valid transmission loss R' is given as $$R' = 20\log_{10}\left(\frac{\overline{\omega}m}{2\rho_0 c}\right) - 5 \quad [dB] \qquad (2)$$

Equation (2) is called a field incidence mass law.

(2) Sound Shielding Analysis for Multi-layered Plate

Sound shielding analysis is made in a manner similar to that in the sound shielding analysis for a single-layered plate. However, for the multi-layered plate, a surface density $m_n$ is calculated by summing areal densities, $m_i$, of each component plate, as represented by $$m_n = \Sigma m_i \qquad (3)$$

Therefore, a transmission loss, $R_n$, of the multi-layered plate is given as $$R_n = 20\log_{10}\left(\frac{\overline{\omega}m}{2\rho_0 c}\right) - 5 \quad [dB] \qquad (4)$$

(3) Sound Shielding Analysis for Hollow Plate

Figure 3:
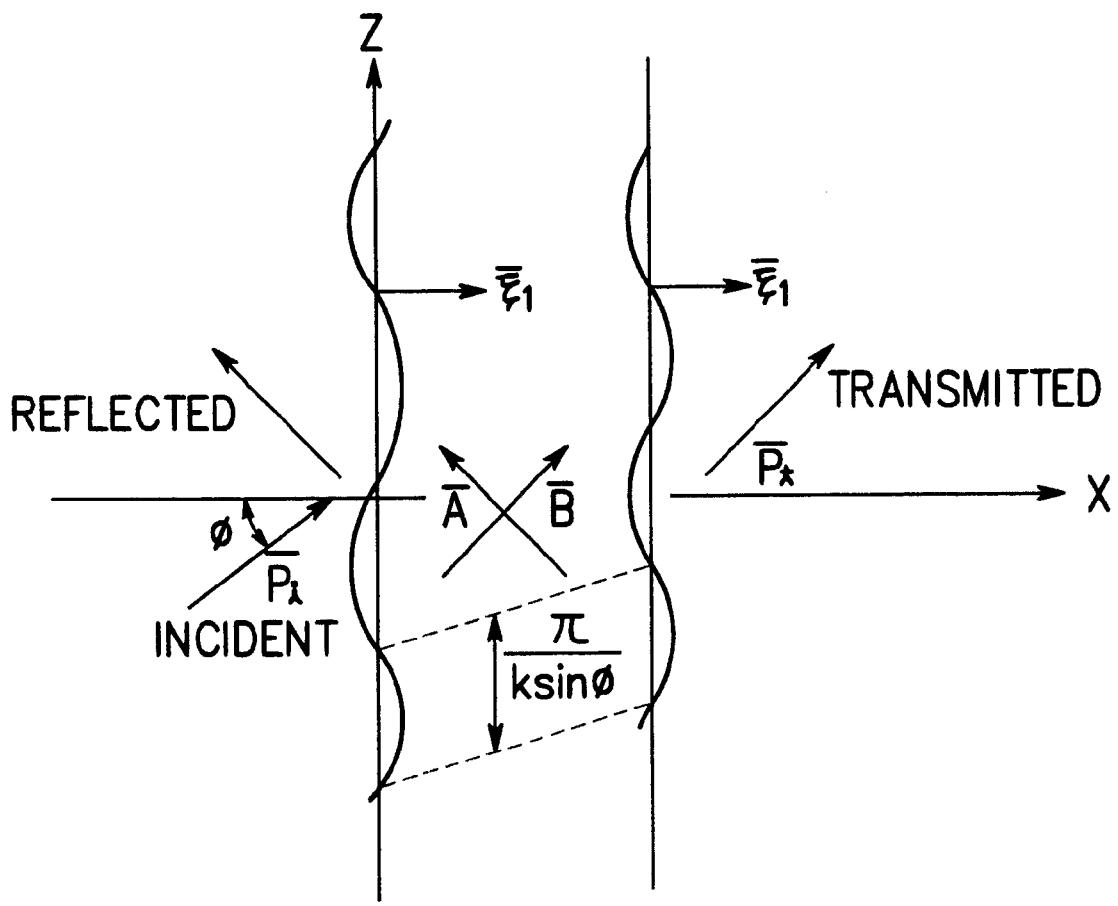
FIG. 3 is a diagram illustrating transmission characteristics for the case where sounds transmit through a hollow plate.

Unlike in the single-layered plate and the multi-layered plate, a more complicated formula is used for the hollow plate. An air layer between the panels, shown in FIG. 3, has a great influence on the transmission loss of sounds, so that full consideration should be given to the air layer. For perpendicular incident of the sounds, a ratio of an incident wave pi to a transmitted wave pt is defined as $$\frac{pt}{pi} = \frac{-2j(\rho_0 c)^2/(kd)}{[Z_1 + \rho_0 c)/(kd)][Z_2 + \rho_0 c - (j\rho_0 c)/(kd)] + [\rho_0 c)/(kd)]^2} \qquad (5)$$

where $Z_1$ and $Z_2$: impedance of each component panel k: wave number of the air layer d: distance between component panels Therefore, a sound transmission loss R, is represented by $$R_a = 20\log_{10}\left(\frac{pi}{pt}\right) - 5 \quad [dB] \qquad (6)$$

(4) Coincidence Phenomenon of Panel and Mass Law

Figure 4:
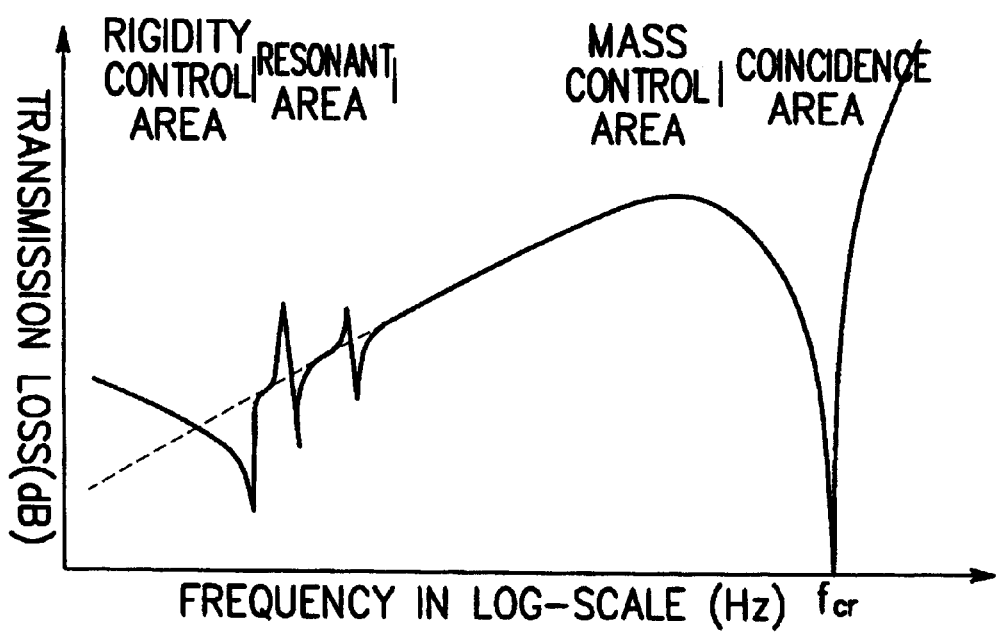
FIG. 4 is a diagram illustrating a transmission loss characteristic of a single-layered plate.

FIG. 4 illustrates a transmission loss characteristic of a single-layered plate, wherein the transmission loss is divided into four areas, as follows:

a) a rigidity control area where the transmission loss is subject to the rigidity of the panel;

b) a resonant area where the transmission loss depends on the property, shape and boundary condition of the panel;

c) a mass control area where the transmission loss is subject to the surface density of the panel; and d) a coincidence area where the transmission loss is subject to the property and thickness of the panel.

In the mass control area out of the above four areas, it is possible to calculate the sound transmission loss using Equations (1) to (6). In the coincidence area covering a critical frequency $f_{cr}$ of the panel, the transmission loss is minimized. Since the mass law is not applied in the vicinity of the critical frequency $f_{cr}$, close attention should be paid, when shielding sounds using a panel.

Shown in Table 1 are values obtained by multiplying critical frequency $f_{cr}$ by thickness h of a panel in a 20° C. atmosphere with respect to several materials.

TABLE 1

| Material | $hf_{cr}$ |
|---|---|
| Steel | 12.4 |
| Aluminum | 12.0 |
| Brass | 17.8 |
| Copper | 16.3 |
| Glass | 12.7 |
| Perspex | 27.7 |
| Chipboard | 23 |
| Plywood | 20 |
| Asbestos Cement | 17 |
| Dense | 19 |
| Porous | 33 |
| Light | 34 |

It is possible to calculate the transmission loss using the above Equations, on the assumption that the hard disk drive cover has a panel structure. That is, it is possible to analyze transmission losses of the single-layered plate, the multi-layered plate and the hollow plate, by modeling a theoretical analyzing method for a sound shielding loss of the panel structure and executing a calculation program for transmission loss.

Figure 5A:
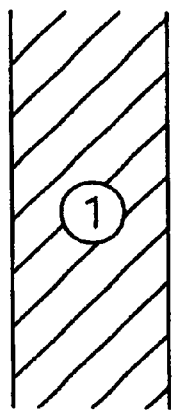
FIGS. 5A and 5B are cross-sectional views of conventional single-layered and multi-layered HDD covers, respectively.
Figure 5B:
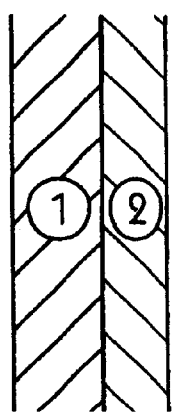

FIGS. 5A and 5B illustrate cross-sectional views of conventional DHH covers. More specifically, FIG. 5A illustrates a cross-sectional view of a Model A, i.e., a single-layered plate structure, and FIG. 5B illustrates a cross-sectional view of a Model B, i.e., a multi-layered plate structure, wherein two panels made of different materials are folded. Here, the two plates are equal to each other in whole thickness.

TABLE 2

| Property | Model A | Model B Plate 1 | Plate 2 |
|---|---|---|---|
| Density (Kg/m³) | 2646 | 2646 | 7860 |
| Elastic Modulus (Gpa) | 70 | 70 | 200 |
| Poisson Ratio | 0.33 | 0.33 | 0.3 |
| Thickness (mm) | 2.6 | 1.8 | 0.8 |

Table 2 shows properties and thickness of the panels used for sound shielding analysis. Making a comparison of the properties and thickness between the Models A and B, the two models are equal to each other in the whole thickness, and the Model A is made of the same material as that of a first plate ① of the Model B. Further, a second plate ② of the Model B is made of a material having higher density and elastic modulus as compared with the first plate ①.

Figure 6:
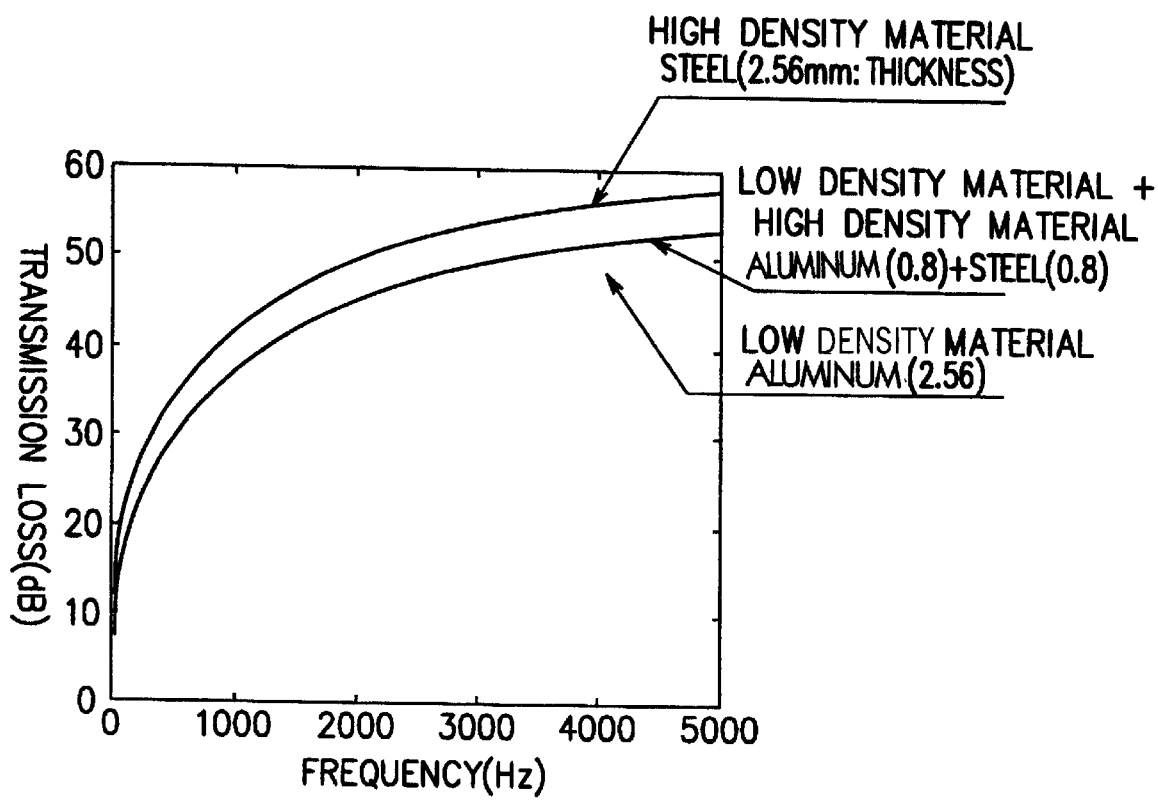
FIG. 6 is a diagram illustrating transmission loss characteristics of the respective covers shown in FIGS. 5A and 5B.

FIG. 6 illustrates calculated transmission losses of the Models A and B, shown in FIGS. 5A and 5B and Table 2. It is noted that though the Models A and B are equal to each other in the whole thickness, a difference in transmission loss between the two Models A and B is about 10 dB. This is because transmission loss of the single-layered plate and the multi-layered plate depends mainly on the mass law. That is, the transmission loss is affected by the surface density rather than the thickness. Therefore, to increase the sound shielding loss of the hard disk drive cover, it is preferable to use a cover damper having a higher surface density rather than increasing the thickness.

Figure 7:
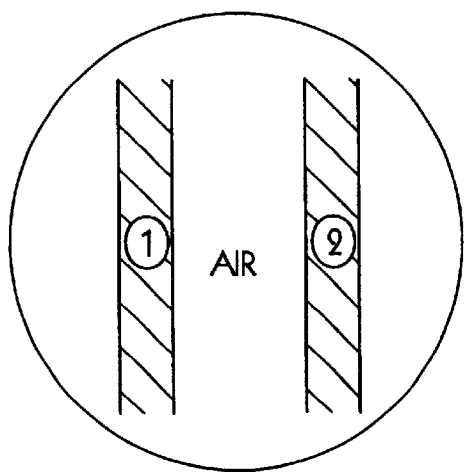
FIG. 7 is a cross-sectional view of a hard disk drive cover to which a hollow plate is applied.

FIG. 7 illustrates a cross-sectional view of a hard disk drive cover having a hollow plate structure. In the embodiment, an air gap is set to a specific value in consideration of a space between the cover and the disk.

Shown in Table 3 are properties and thickness of a panel used for the hard disk drive cover according to an embodiment of the present invention. Further, Table 4 shows properties of the air.

TABLE 3

| Property | Plate 1 | Plate 2 |
|---|---|---|
| Density (Kg/m$^3$) | 2646 | 7860 |
| Elastic Modulus (Gpa) | 70 | 200 |
| Poisson Ratio | 0.33 | 0.3 |
| Thickness (mm) | 2.6 | 0.8 |

TABLE 4

| Air Gap (mm) | Density (Kg/m$^3$) | Sound Velocity (m/sec) |
|---|---|---|
| 2 | 1.21 | 340 |

With regard to the properties given in Table 3, as in the multi-layered plate shown in FIGS. 5A and 5B and Table 2, the second plate ② (i.e., the cover damper) is made of a material having a higher density as compared with that of the first plate ①. Shown in Table 4 are the properties of the air existing between and around the plates, wherein the air layer between the plates is assumed to have the same property as that of the air outside the plates, for convenience of analysis.

Figure 8:
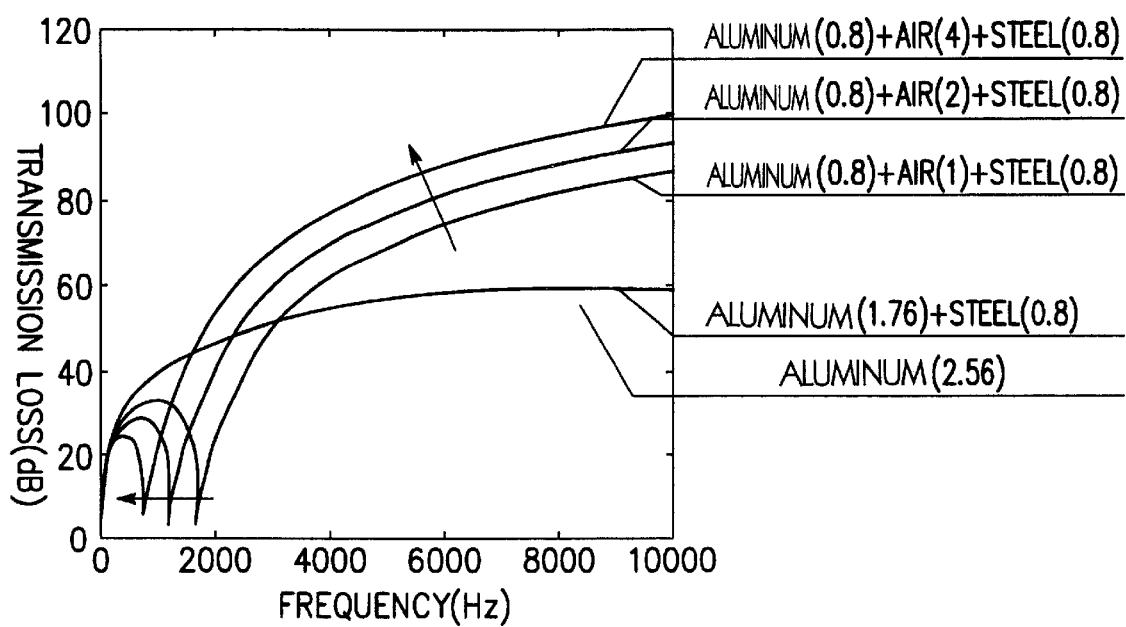
FIG. 8 is a diagram comparatively illustrating transmission loss characteristics of single-layered plate, multi-layered plate and hollow plate.

FIG. 8 comparatively illustrates transmission losses of the single-layered plate structure, the multi-layered structure and the hollow plate structure. The single-layered plate and the multi-layered plate equally have the whole thickness of 2.56 mm. The hollow plate structure has the thickness, which depends on the air gap, but the thickness of the component plates is 1.6 mm, which is smaller than that of the single-layered plate and the multi-layered plate. It is noted from FIG. 8 that though the hollow plate has the reduced thickness as compared with that of the multi-layered plate, it has an increased transmission loss. In particular, a transmission loss difference between the single-layered plate and the multi-layered plate is almost constant at the higher frequency, whereas a transmission loss of the hollow plate is much higher than that of the single-layered plate and the multi-layered plate at the higher frequency. This is because transmission loss of the single-layered plate and the multi-layered plate depends mainly on the mass law, whereas the transmission loss of the hollow plate increases in proportion to the frequency due to an influence of the air layer. That is, not only the surface density of the panel but also the air layer affects the transmission loss of the hollow plate.

In FIG. 8, unlike the single-layered plate and the multi-layered plate, the hollow plate structure has a frequency where the transmission loss is remarkably low, wherein the frequency is determined according to the property of the panel and the thickness of the air layer. The above-stated frequency is called mass-air-mass resonance frequency. Further, it is noted that this frequency shifts according to the thickness of the air layer. That is, the frequency decreases remarkably, when the air layer increases in thickness. Since this property forms a unfavorable frequency band in terms of the transmission loss, careful consideration should be given to this property when applying the hollow plate to the hard disk drive cover.

It could be understood from the foregoing description that the hollow plate has a higher sound shielding capability than that of the single-layered plate or the multi-layered plate. In the embodiment, a vibration characteristic of the hard disk drive cover has been analyzed by finite element analysis.

In the embodiment, the shape of the cover 60 shown in FIG. 1 is defined as a finite element model, and then, mode analyzing has been performed for the finite element model as using a commercial structure analyzing software, MSC/NASTRAN VER. 70. The finite element model used has 2106 nodes and 2035 shell elements. To verify the finite element analysis results, the analysis results were compared with the experiment results at a free boundary condition; as the result of the comparison, inherent vibration number was almost equal.

Further, in the embodiment, the shape of the cover was defined as eight finite element Models A, B, C, D, E, F, G and H, each having the following conditions, and inherent vibration number of the hard disk drive cover was analyzed with respect to the respective models.

The conditions of the respective models are as follows:

Model A: free boundary (a state where the screws are not tightened)

Model B: a boundary condition is added to the portions where the screws are tightened.

Model C: an air layer is maximized (Model B+air layer)

Model D a bead is added to a space between the disk and an FPC (Model C+bead)

Model E: a "+"-shaped bead is added to an upper portion of the disk (Model D+"+"-shaped bead)

Model F: a "X"-shaped bead is added to an upper portion of the disk (Model C+"X"-shaped bead)

Model G: modified model (x-type)

Model H: a cover damper is attached to the modified model (Model G+cover damper)

Table 5 comparatively shows inherent vibration numbers of the respective hard disk drive cover models in terms of frequency.

TABLE 5

| Mode | A | B | C | D | E | F | G | H |
|---|---|---|---|---|---|---|---|---|
| 1 | 228.06 | •1299.34 | 1515.49 | 1499.71 | 1500.34 | 1515.96 | •1363.20 | •896.28 |
| 2 | 592.88 | •1421.04 | •1606.28 | •1622.05 | •1607.16 | •1604.33 | •1390.17 | •954.13 |
| 3 | 1050.98 | •1512.26 | •1641.35 | •1760.91 | •1775.15 | •1766.82 | •1469.16 | •1110.47 |
| 4 | 1103.67 | •1593.94 | •1967.46 | •1969.05 | •2026.34 | •1999.57 | •1565.27 | •1144.27 |
| 5 | 1237.67 | •1935.42 | 2208.08 | 2247.87 | 2247.38 | 2261.21 | •1937.12 | •1493.96 |
| 6 | 1569.85 | 2276.60 | •2453.86 | •2445.65 | 2472.70 | 2469.13 | 2210.15 | •1853.46 |
| 7 | 1608.57 | 2308.69 | •2600.89 | •2645.69 | •2626.11 | •2662.79 | 2291.17 | •1920.47 |
| 8 | 1801.70 | •2525.43 | 2747.26 | 2728.09 | 2794.38 | 2768.24 | •2460.01 | 2035.50 |
| 9 | 2005.32 | •2734.36 | 2962.71 | 3020.10 | •3025.15 | •3060.43 | •2667.54 | 2186.81 |
| 10 | 2122.50 | 2760.10 | •3296.58 | •3087.63 | 3164.25 | 3127.44 | 2676.92 | 2300.75 |
| 11 | 2521.36 | •2849.83 | 3392.99 | 3435.43 | 3326.13 | •3340.37 | •2881.62 | 2573.63 |
| 12 | 2593.28 | 3025.51 | 3433.38 | •3580.32 | 3536.07 | 3500.53 | •2929.73 | 2616.56 |
| 13 | 2802.24 | 3374.94 | •3680.52 | 3673.49 | •3697.94 | 3758.22 | 3105.07 | •2822.03 |
| 14 | 3002.73 | •3474.19 | 3868.26 | •3890.99 | 3735.81 | 3855.10 | 3370.14 | 2927.20 |
| 15 | 3143.64 | 3657.18 | 3959.33 | 4049.22 | 4013.95 | •3924.34 | 3561.43 | 3153.26 |
| 16 | 3329.17 | 3681.60 | •4251.52 | •4381.07 | 4153.33 | •4442.26 | 3585.60 | 3320.21 |
| 17 | 3422.23 | •3826.70 | 4538.36 | •4514.32 | •4473.82 | •4496.43 | 3871.45 | 3541.73 |

TABLE 5-continued

| Mode | A | B | C | D | E | F | G | H |
|---|---|---|---|---|---|---|---|---|
| 18 | 3780.62 | 4024.19 | 4949.61 | 5019.96 | 5046.81 | 4678.95 | •4008.34 | 3592.90 |
| 19 | 3794.63 | •4177.16 | 4985.91 | 5117.22 | 5155.96 | 5175.68 | •4155.76 | 3719.61 |
| 20 | 4238.23 | •4382.31 | 5284.27 | 5316.25 | 5369.13 | 5255.36 | •4362.74 | 3915.42 |
| 21 | 4303.29 | •4486.28 | 5351.71 | 5442.84 | 5477.50 | 5394.51 | •4619.28 | 4114.00 |
| 22 | 4392.98 | •4722.09 | 5603.35 | 5627.06 | 5818.06 | 5686.64 | •4798.55 | 4274.19 |
| 23 | 4437.62 | 4860.41 | 5821.23 | 5876.20 | 5993.37 | | •4857.54 | •4445.07 |
| 24 | 4583.17 | 5106.52 | 5988.22 | | | | 5076.37 | 4508.07 |
| 25 | 4769.86 | 5179.68 | | | | | 5158.50 | 4651.11 |
| 26 | 4863.19 | 5271.08 | | | | | 5363.99 | •4808.97 |
| 27 | 5078.04 | 5452.17 | | | | | 5500.44 | •4897.84 |
| 28 | 5172.25 | 5621.11 | | | | | 5606.73 | 5045.00 |
| 29 | 5380.21 | 5758.89 | | | | | 5840.10 | 5320.22 |
| 30 | 5406.48 | | | | | | | 5568.91 |

In Table 5, •-marked numbers represent the greater vibration width in the same mode, and the other numbers the lower vibration width in the same mode. The non-modified Models A, B, C, D, E and F were compared with one another at a frequency band of 2,000–4,000 Hz where the noise problem occurs. It is noted from the comparison that the Models C and F show the less number of modes having a greater vibration width. However, it is noted that the mode number in the upper direction (Z-axis) of the cover where regarded the noises mainly transmit through is smaller in the order of Models E, C, F and D. From this, it can be understood that the Model E is the most advantageous to the shape of the cover and the Models C and F are next advantageous to the shape of the cover.

From finite element analysis, although it is found that the Model E has the highest transmission loss, the Model F is advantageous to the presently available process. That is, the Model E is difficult to manufacture with the presently available hard disk drive manufacturing process. Therefore, in the embodiment of the present invention, a hard disk drive cover structure modified based on the Model F is provided. That is, there is provided an hard disk drive cover structure modified to the Model G and the Model H shown in Table 5. In the feature, when it is easy to make the Model E with the improvement of the hard disk drive manufacturing process, it will be possible to implement a hard disk drive cover structure modified based on the Model E.

Figure 9:
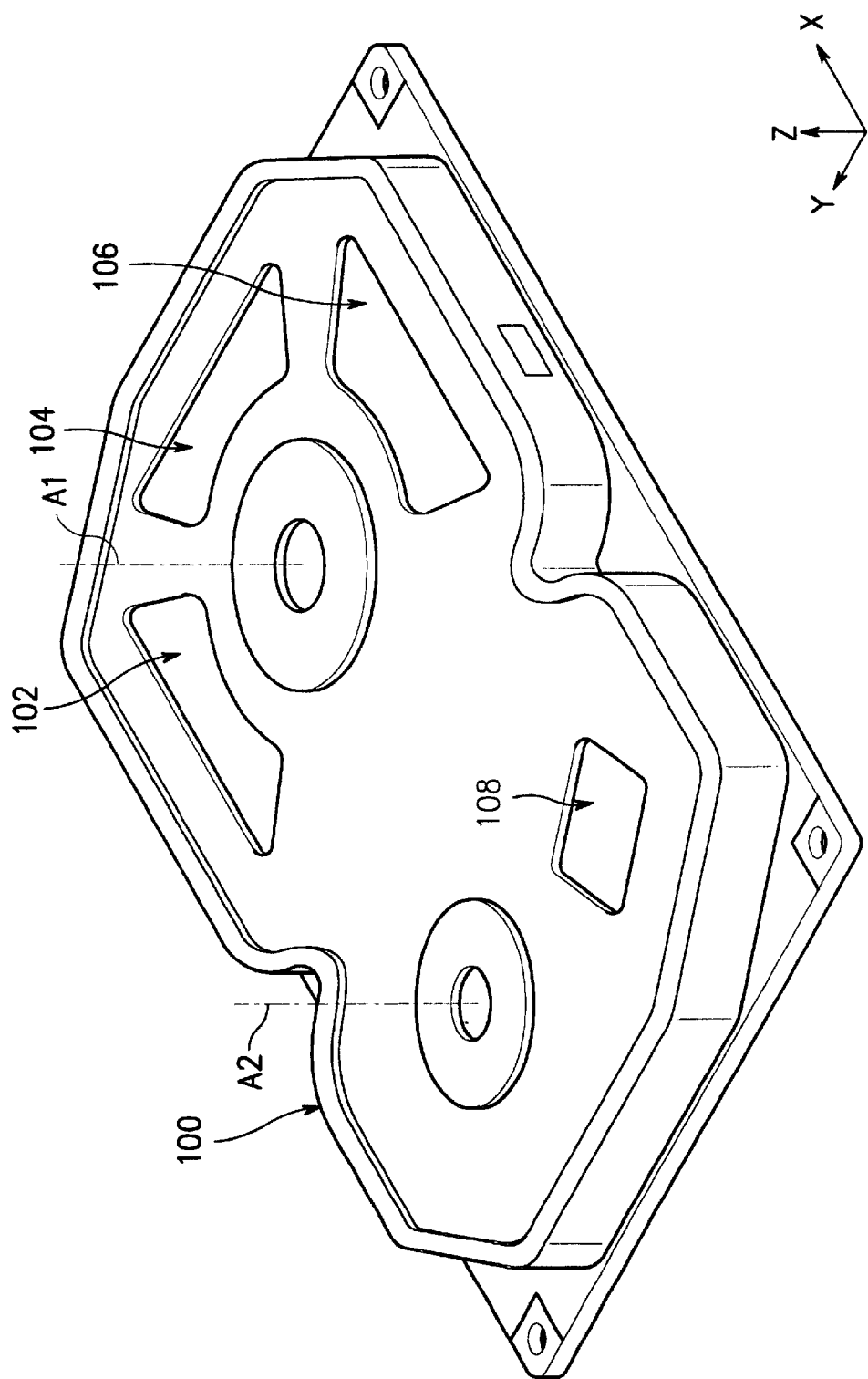
FIG. 9 is a perspective view of a hard disk drive cover according to an embodiment of the present invention, wherein a cover damper is detached from the hard disk drive cover.

FIG. 9 illustrates an hard disk drive cover according to a preferred embodiment of the present invention, wherein a cover damper is removed (Model G). Referring to FIG. 9, air layers 102, 104, 106 and 108 are formed on a cover 100. The air layers 102, 104 and 106 are formed at three upper parts of the disks so that a cover surface of the disks has an "X"-shaped bead. That is, the recesses are separated by radial arm portions of the cover surface, radiating from the spindle motor axis. The air layers 102, 104 and 106 are formed at three edges on the cover surface on the basis of the rotation axis A1 of the spindle motor 30, shown in FIG. 1. Alternatively, the bead may be oriented to give a "+"-shape. Further, the rectangular air layer 108 is formed at the side of the VCM. That is, the rectangular air layer 108 is formed at the right side of the rotation axis A2 of the actuator 40, where an FPC cable is disposed.

Figure 10:
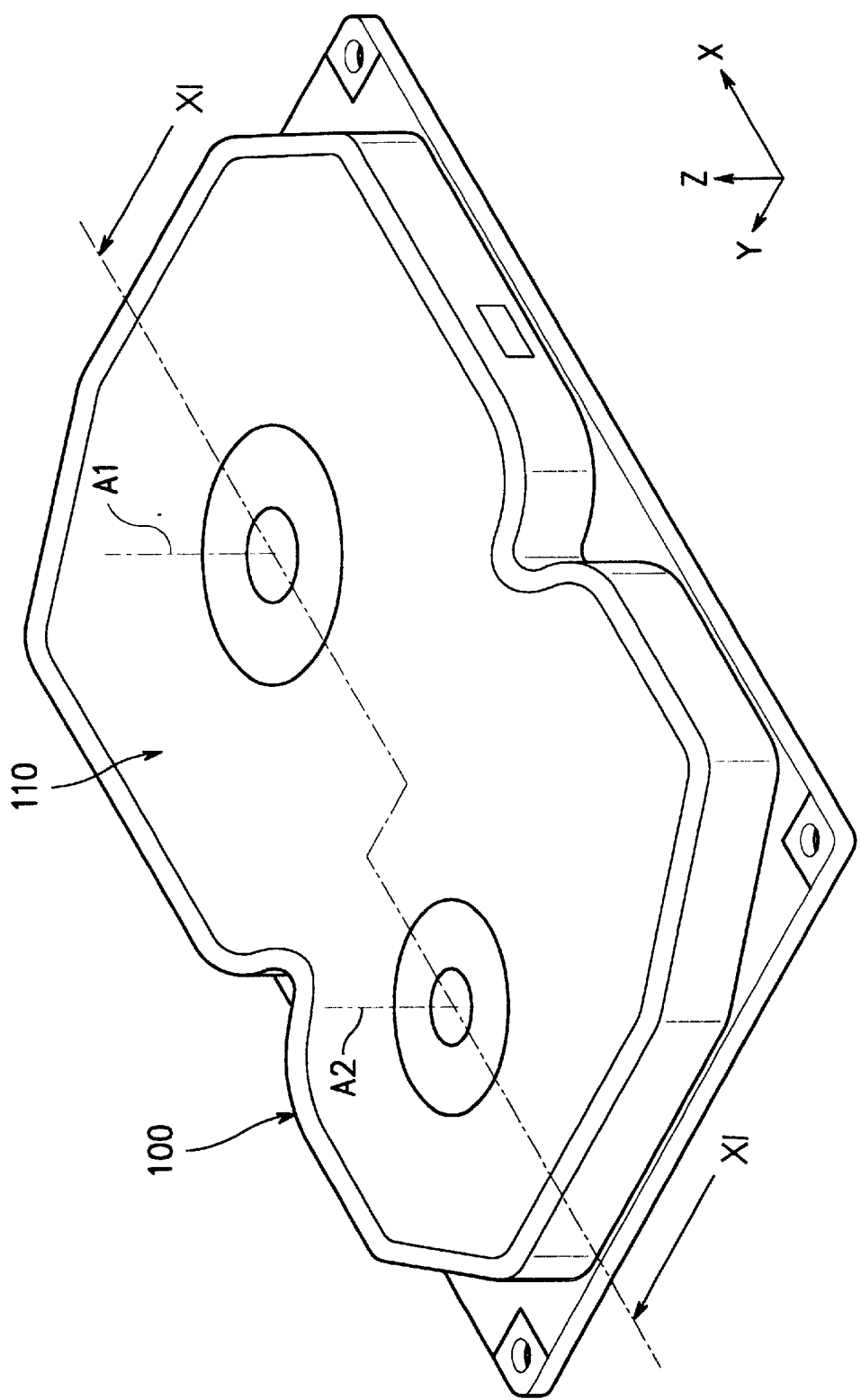
FIG. 10 is a perspective view of a hard disk drive cover according to an embodiment of the present invention, wherein a cover damper is mounted on the hard disk drive cover.
Figure 11:
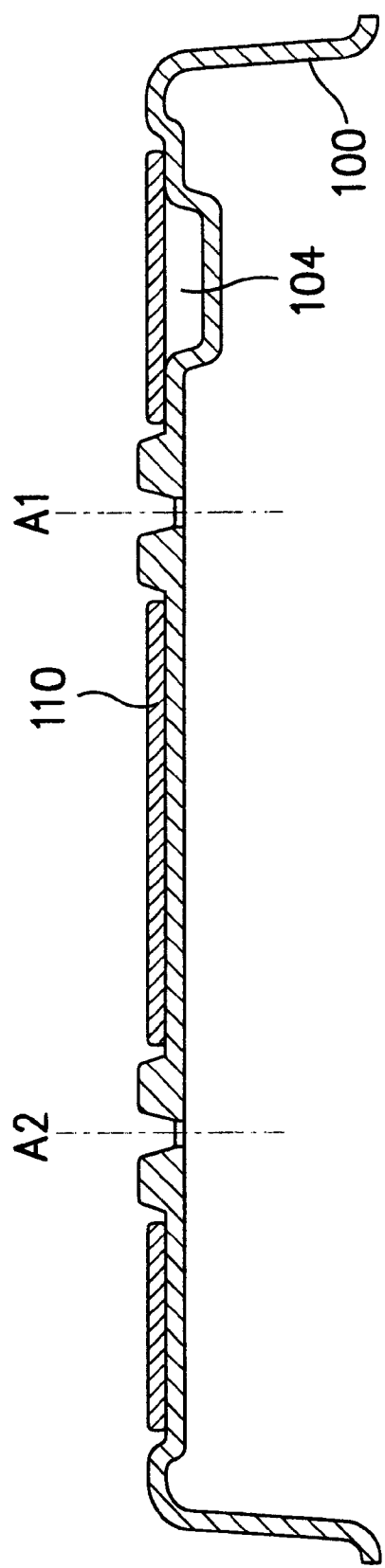
FIG. 11 is a cross-sectional view of the cover of FIG. 10, taken along line XI—XI.

FIG. 10 illustrates the hard disk drive cover according to a preferred embodiment of the present invention, wherein a cover damper 110 is attached to the cover 100. The hard disk drive cover of FIG. 10 is a Model G in which an "X"-shaped bead is added to the air layers and the upper part of the disk (Model D+"X"-shaped bead) and then the cover damper 110 is attached thereto. That is, the cover damper is attached to the cover having the radial arm portions defining the air layers. FIG. 11 shows a cross-sectional view of the hard disk drive cover of FIG. 10, taken along line B-B'.

Table 6 below shows the properties and thickness of the cover 100 and the cover damper 110 used for the hard disk drive cover of FIG. 10 according to an embodiment of the present invention.

TABLE 6

| Property | Cover (100) | Cover Damper (110) |
|---|---|---|
| Density (Kg/m$^3$) | 2646 | 7860 |
| Elastic Modulus (Gpa) | 70 | 200 |
| Poisson Ratio | 0.33 | 0.3 |
| Thickness (mm) | 0.8 | 0.8 |

The properties show in Table 6 are equal to the properties shown in Table 3 except that the cover 100 has a thickness of 0.8 mm. In Table 3, the thickness of the first plate is set to 2.6 mm. Further, with reference to Table 6, the cover damper 110 is made of material having a higher density as compared with the cover 100. In the exemplary embodiment, the cover 100 is made of aluminum and the cover damper 110 is made of steel.

Table 7 shows properties of an air gap between and around the cover 100 and the cover damper 110, and is equal to Table 4. For convenience, it is assumed in FIG. 7 that the air layers 102, 104, 106 and 108 between the cover 100 and the cover damper 110 and the air outside thereof have the same properties.

TABLE 7

| Air Gap (mm) | Density (Kg/m$^3$) | Sound Velocity (m/sec) |
|---|---|---|
| 2 | 1.21 | 340 |

Figure 12:
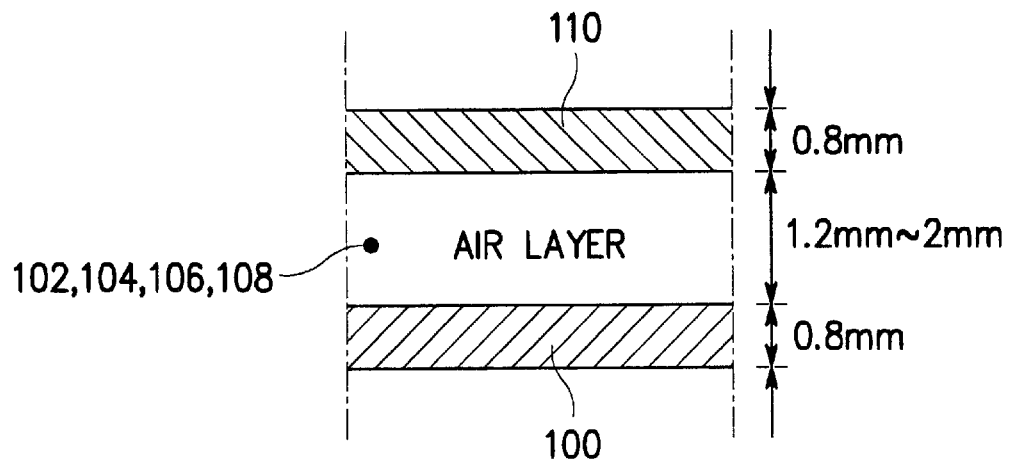
FIG. 12 is a cross-sectional view illustrating thickness of cover, cover damper, and air layer.

FIG. 12 shows the properties and the air gaps of the air layers 102, 104, 106 and 108 of the cover 100 and the cover damper 110 show in Tables 6 and 7.

In the embodiment of the present invention, the hard disk drive cover with the cover damper 110 removed, shown in FIG. 9, is defined as a Model G and the hard disk drive cover with the cover damper 110 attached, shown in FIG. 10, is defined as a Model H, to measure vibration properties of the hard disk drive cover.

The noises radiating through the hard disk drive cover in operation are mainly affected by a mode in the vertical direction of the hard disk drive cover. Therefore, it is preferable to compare the number of the modes at issue rather than compare the whole number of the modes at the frequency band of interest, 2,000–4,000 Hz.

As the results of analysis, with regard to the Model H, the whole number of modes is not reduced, but the number of modes corresponding to the upper surface of the cover is reduced.

Figure 13:
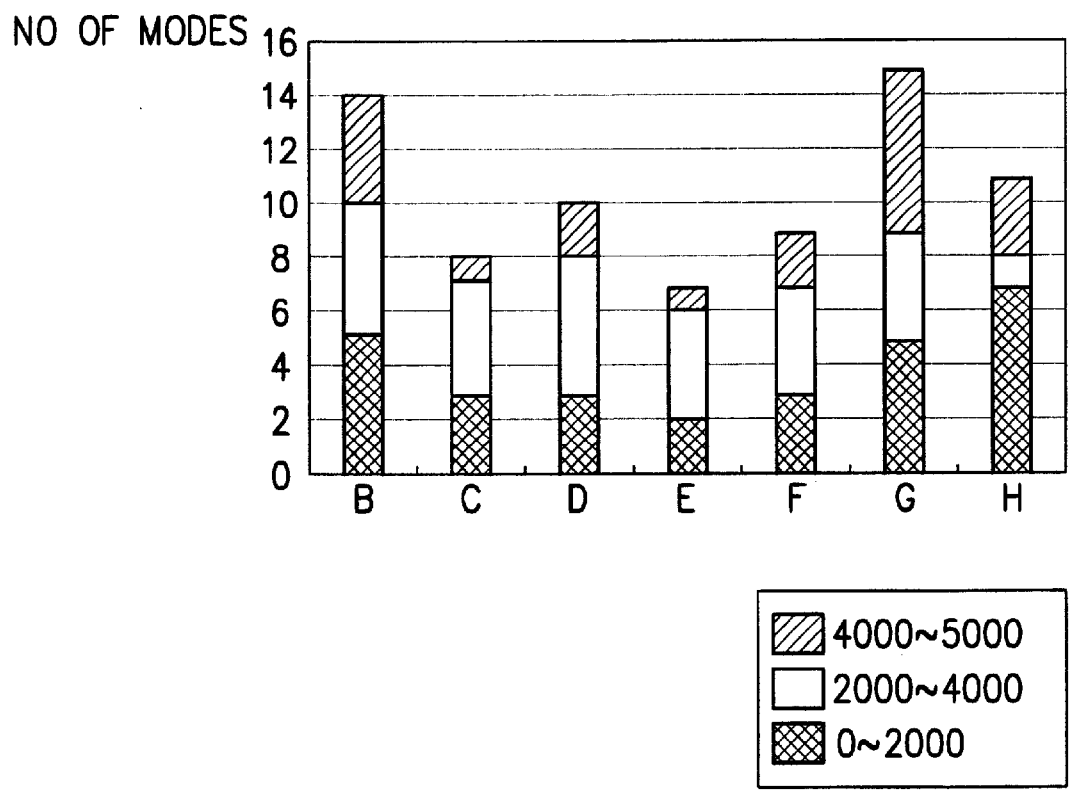
FIG. 13 is a diagram comparatively illustrating the number of modes in the vertical direction (i.e., on the Z-axis) of the cover for seven cover models.

FIG. 13 comparatively illustrates the number of modes in the vertical (Z-axis) direction of the cover for seven cover models other than the free boundary model (Model A). With regard to the vertical modes for the seven models, i.e., Models B, C, D, E, F, G and H, the Model H shows the improved noise and vibration properties as compared with the other models. In particular, the Model H scarcely exhibits any mode at the interested frequency band of 2,000–4,000 Hz. Therefore, when the Model H is applied, the noise and vibration problems can be effectively solved.

In the embodiment of the present invention, noises and vibrations have been measured through experiments for the hard disk drive model to which the modified hard disk drive cover (i.e., the Model H shown in FIG. 10).

First, to examine a method for experimenting on vibration of the hard disk drive cover, an object of vibration measurement was defined as a model to which a modified cover is applied and a model to which non-modified cover is applied, and then vibration was measured and compared for each model. For measurement, the hard disk drive is driven in an idling state when the hard disk drive is completely assembled, to measure a vibration value at a particular measuring point on the cover. To maintain the same condition, only the cover was reassembled without exchanging the body and the measurement was repeated.

FIGS. 14A to 14C comparatively illustrate vibrations in an idling state with respect to a non-modified cover model, a modified cover model (i.e., Model G) and a Model G which is a modified cover model mounted with the cover damper 110, respectively. As a whole, the non-modified model is not so different from the modified model. However, it is noted that the models of FIG. 14B and 14C, to which the modified cover is applied, have the remarkably reduced peak at the frequency of about 3,100 Hz. In addition, it is noted that the Model H mounted with the cover damper 110 has the reduced vibration displacement as compared with the other two models.

Next, to examine a method for experimenting on vibration of the hard disk drive cover, sound pressure was measured and compared for the non-modified cover-applied model, the modified cover-applied model and the modified model mounted with the cover damper. For measurement, the hard disk drive is driven in an idling state when the hard disk drive is completely assembled, and the sound pressure was measured using a microphone placed at a position 30 cm over the cover. To maintain the same condition, only the cover was reassembled without exchanging the body and the measurement was repeated.

Figure 15A:
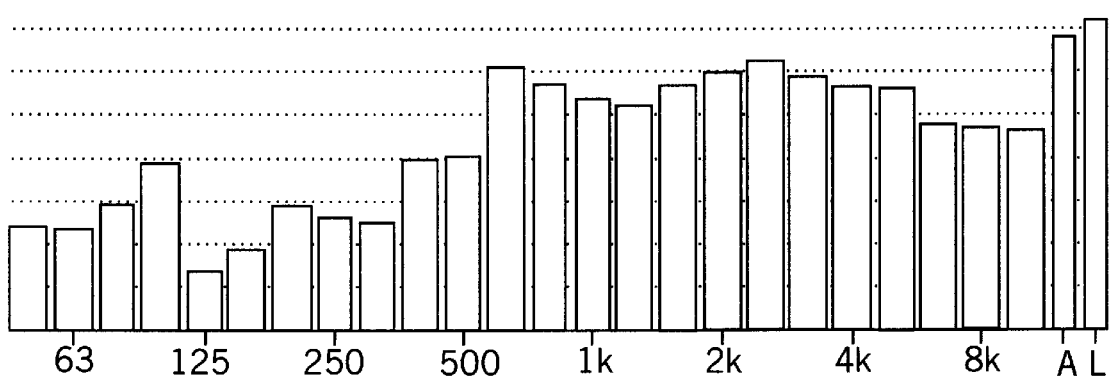
FIG. 15A is a diagram illustrating a simulation result wherein sound pressure is measured over ⅓ octave band for the non-modified cover model in the idling state.
Figure 15B:
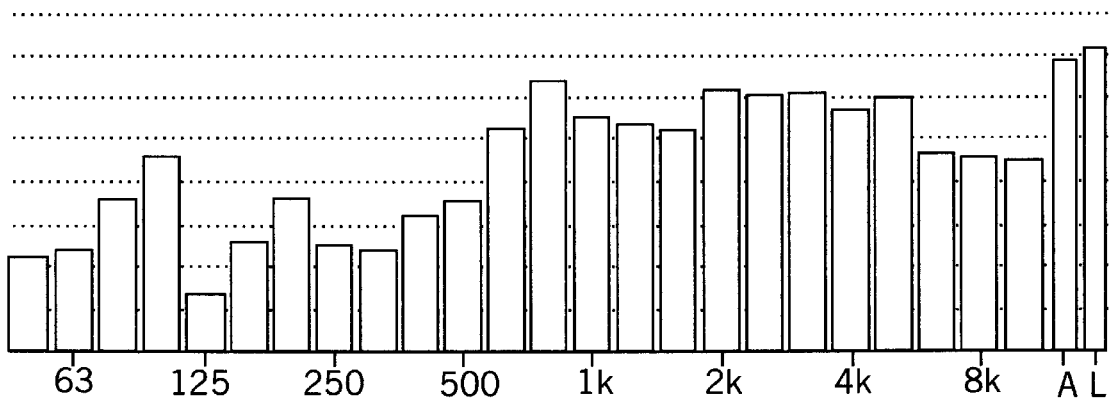
FIG. 15B is a diagram illustrating a simulation result wherein sound pressure is measured over ⅓ octave band for the modified cover model in the idling state.
Figure 15C:
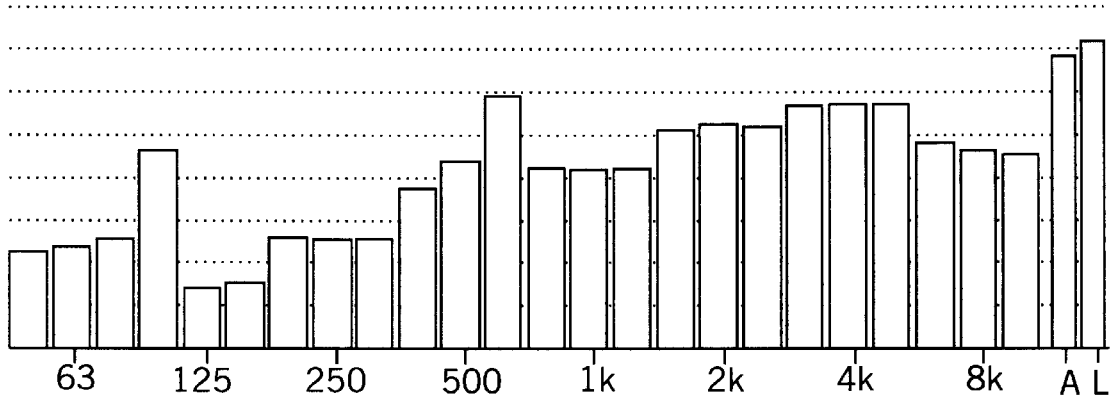
FIG. 15C is a diagram illustrating a simulation result wherein sound pressure is measured over ⅓ octave band for the modified model mounted with the cover damper in the idling state.

FIGS. 15A to 15C illustrate the simulation results wherein sound pressures are measured over ⅓ octave band for the non-modified cover-applied model, the modified cover-applied model and the modified cover and the cover damper-applied model driven in the idling state, respectively. From the simulation results of FIGS. 15A to 15C, it is noted that the non-modified model of FIG. 15A is not so different from the modified model of FIG. 15B in the overall sound pressure level. However, it is noted that the modified model is higher by about 0.3 dB on the overall level. When viewed according to the frequency bands, the modified cover-applied model has the higher sound pressure than the non-modified cover-applied model, at the center frequency band 800 Hz and the frequency band 5 KHz. However, the sound pressure was reduced at the frequency band of 2,000–4,000 Hz which was at issue during noise measurement. It can be noted that the Model H mounted with the cover damper has the reduced noises as compared with the other two models.

As described above, the novel hard disk drive cover includes air layers between the cover and the cover damper to minimize the internal noises and vibrations.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A cover structure of a hard disk drive, comprising:
   a cover;
   a cover damper mounted on the cover; and
   at least one recess formed in the cover, at least one air layer being formed between the cover and the cover damper when the cover damper is mounted on the cover to at least partly enclose the at least one air layer within the at least one recess, the at least one recess being formed to prevent air from passing from an exterior of the hard disk drive to an interior of the hard disk drive directly through the at least one recess, the at least one air layer not encircling a rotation axis of an actuator of the hard disk drive.

2. The cover structure as claimed in claim 1, the cover damper fully enclosing the at least one air layer within the at least one recess.

3. The cover structure as claimed in claim 2, wherein the at least one air layer is formed on a cover surface at a location being apart from the rotation axis of an actuator.

4. The cover structure as claimed in claim 2, wherein the at least one air layer corresponds to a plurality of air layers formed in a plurality of separately spaced recesses on the cover surface, the plurality of recesses including the at least one recess.

5. The cover structure as claimed in claim 4, wherein the cover surface has an "X"-shaped bead separating the plurality of recesses formed on the cover surface.

6. The cover structure of claim 5, the plurality of air layers in the plurality of recesses not directly exchanging air with the interior of the hard disk drive.

7. The cover structure of claim 6, the plurality of air layers in the plurality of recesses not directly exchanging air with each other.

8. The cover structure of claim 5, the plurality of air layers in the plurality if recesses not exchanging air with the interior of the hard disk drive.

9. The cover structure as claimed in claim 4, wherein the cover surface has an "+"-shaped bead separating the plurality of recesses formed on the cover surface.

10. The cover structure as claimed in claim 3, wherein the at least one air layer corresponds to a plurality of air layers in a plurality of recesses, the recesses being formed at predetermined parts on the cover surface apart from a rotation axis of a spindle motor, the plurality of recesses including the at least one recess.

11. The cover structure as claimed in claim 3, wherein the at least one recess us rectangular.

12. The cover structure as claimed in claim 2, wherein the at least one air layer is enclosed at a location on a cover surface apart from a rotating axis of an actuator.

13. The cover structure of claim 2, the at least one air layer fully enclosed in the at least one recess not exchanging air with the interior of the hard disk drive.

14. The cover structure as claimed in claim 1, wherein the at least one air layer is several millimeters.

15. The cover structure of claim 1, the at least one air layer in the at least one recess not directly exchanging air with the interior of the hard disk drive.

16. A cover structure of a hard disk drive, comprising:
   a cover having a stepped surface formed at an upper portion thereof and at a portion being apart from a rotation axis of an actuator;
   a cover damper; and
   at least one air layer formed between the cover and the cover damper, the at least one air layer being formed to prevent air from passing from an exterior of the hard disk drive to an interior of the hard disk drive directly through the at least one air layer, the at least one air layer not encircling the rotation axis of an actuator of the hard disk.

17. The cover structure as claimed in claim 16, wherein the cover and the cover damper have a thickness of 0.8 mm and the at least one air layer has a thickness of 1–2 mm.

18. The cover structure as claimed in claim 17, wherein the cover damper is made of material having higher density than material of the cover.

19. A hard disk drive, comprising:
a rectangular base;
a spindle motor mounted in the base, and having a rotation axis perpendicular to the base;
a hard disk mounted to the spindle motor;
an actuator mounted on the base, said actuator having a second rotation axis perpendicular to the base;
a flexible printed circuit connected to the actuator and located on one side of the rotation axis of the actuator;
a cover formed of a first material mounted on the base, said cover comprising:
a top cover substantially parallel to said rectangular base;
at least one recess formed on one portion of the top surface, said at least one recess being formed spaced apart from said rotation axis of said spindle motor and spaced apart from said second rotation axis of said actuator; and
a damper formed of a second material mounted on the top surface of said cover, enclosing an air gap between the damper and the at least one recess of the top surface, the at least one recess being formed to not allow air to directly pass from an exterior of the hard disk drive to an interior of the hard disk drive through the at least one recess, the air gas not encircling the second rotation axis of the actuator of the hard disk.

20. The hard disk drive of claim 19, further comprising:
said second material being denser than said first material.

21. The hard disk drive of claim 20, further comprising:
the density of said second material being approximately 7860 kg/m$^3$ and the density of said first material being approximately 2650 kg/m$^3$.

22. The hard disk drive of claim 19, further comprising:
said second material having a higher elastic modulus than said first material.

23. The hard disk drive of claim 22, further comprising:
the elastic modulus of said second material being approximately 200 GPa and the elastic modulus of said first material being approximately 70 GPa.

24. The hard disk drive of claim 19, further comprising:
said air gap having a thickness in the range of approximately 1.2 to 2 mm.

25. The hard disk drive of claim 19, further comprising:
said top surface of said cover having a thickness of approximately 0.8 mm.

26. The hard disk drive of claim 19, further comprising:
said damper having a thickness of approximately 0.8 mm.

27. The hard disk drive of claim 19, further comprising:
said first material being aluminum and said second material being steel.

28. The hard disk drive of claim 19, further comprising:
said at least one recess including a first recess being formed in the cover in a region over a portion of the hard disk.

29. The hard disk drive of claim 28, further comprising:
said at least one recess further including a second recess formed in the cover over a portion of the hard disk, said second recess separated from said first recess by a first arm of said top surface formed radially to the rotation axis of the spindle motor.

30. The hard disk drive of claim 29, further comprising:
said at least one recess further including a third recess formed in the cover over a portion of the hard disk, said third recess separated from said second recess by a second arm of said top surface formed radially to the rotation axis of the spindle motor and perpendicular to said first arm.

31. The hard disk drive of claim 30, further comprising:
said first, second and third recesses being formed along three edges of the cover.

32. The hard disk drive of claim 31, further comprising:
said at least one recess further including a fourth recess formed in the cover near the rotation axis of the actuator.

33. The hard disk drive of claim 32, further comprising:
said fourth recess being rectangular in shape.

34. The hard disk drive of claim 33, further comprising:
said fourth recess being formed on the same side of the rotation axis of the actuator as the flexible printed circuit.

35. The hard disk drive of claim 28, further comprising:
said at least one recess further including a second recess formed in the cover near the rotation axis of the actuator.

36. The hard disk drive of claim 35, further comprising:
said second recess being rectangular in shape.

* * * * *